United States Patent [19]
Olshansky et al.

[11] Patent Number: 5,418,785
[45] Date of Patent: May 23, 1995

[54] MULTIPLE-CHANNEL TOKEN RING NETWORK WITH SINGLE OPTICAL FIBER UTILIZING SUBCARRIER MULTIPLEXING WITH A DEDICATED CONTROL CHANNEL

[75] Inventors: Robert Olshansky, Wayland; Paul M. Hill, Millis, both of Mass.

[73] Assignee: GTE Laboratories Incorporated, Waltham, Mass.

[21] Appl. No.: 893,302

[22] Filed: Jun. 4, 1992

[51] Int. Cl.$^6$ ................................. H04J 3/02
[52] U.S. Cl. ........................... 370/85.5; 370/85.11; 370/85.15; 370/110.1; 359/136
[58] Field of Search ................. 370/85.5, 85.4, 85.15, 370/85.14, 85.12, 110.1, 69.1, 58.1, 85.11; 359/115, 118, 123, 135, 136, 137

[56] References Cited

U.S. PATENT DOCUMENTS

| | | | |
|---|---|---|---|
| 4,731,784 | 3/1988 | Keller et al. | 359/136 |
| 4,754,452 | 6/1988 | Henry | 370/85.1 |
| 4,866,704 | 9/1989 | Bergman | 359/137 |
| 5,105,292 | 4/1992 | LeRoy et al. | 359/123 |
| 5,245,605 | 9/1993 | Ofek | 370/85.5 |
| 5,274,637 | 12/1993 | Sakamura et al. | 370/85.5 |

FOREIGN PATENT DOCUMENTS 2224902 11/1988 United Kingdom .

*Primary Examiner*—Douglas W. Olms
*Assistant Examiner*—Shick Hom
*Attorney, Agent, or Firm*—Lawrence E. Monks

[57] ABSTRACT

Apparatus for and method of communicating over a local area network is disclosed. Multiple nodes are connected by an optical fiber in a ring architecture. The cable supports multiple subcarrier multiplexed data communication channels for transmitting and receiving message data between the nodes and a control channel for partitioning nodal access to the individual data channels. Tokens are circulated on the control channel indicating the status of each data channel. A node desiring to send, acquires an open data channel by marking the corresponding control channel token to show that the selected data channel is no longer available, inserts the node destination address into the control channel token, and transmits data on the acquired data channel. A node recognizing its address in the control channel token's destination address field for a particular data channel tunes its receiver to accept data on that channel.

30 Claims, 8 Drawing Sheets

| CONTROL CHANNEL | DATA CHANNEL 1 | DATA CHANNEL 2 | DATA CHANNEL 3 | DATA CHANNEL 4 | DATA CHANNEL 5 | DATA CHANNEL 6 | DATA CHANNEL 7 |
|---|---|---|---|---|---|---|---|
| BIT 0 | BIT 1 | BIT 2 | BIT 3 | BIT 4 | BIT 5 | BIT 6 | BIT 7 |

FIG. 6

MULTIPLE-CHANNEL TOKEN RING NETWORK WITH SINGLE OPTICAL FIBER UTILIZING SUBCARRIER MULTIPLEXING WITH A DEDICATED CONTROL CHANNEL

FIELD OF THE INVENTION

This invention relates generally to a multi-channel communications ring, and more particularly to a multi-channel data communications ring having a single control channel for determining access to multiple multiplexed data channels.

BACKGROUND OF THE INVENTION

Local area ring networks based on the IEEE 802.5 standard have been very successful in providing multiple access interconnections among computers, workstations, terminals and other peripherals using metallic media operating at rates of 1 Megabits/second to 4 Megabits/second (Mb/s). The FDDI standard, which is a fiber optic token-passing ring operating at a rate of 100 Mb/s or 200 Mb/s for dual counter-rotating rings, is widely viewed as the next generation ring. FDDI can operate at distances up to 100 km and serve up to 500 nodes.

There is much recent research to develop Gigibits/second (Gb/s) networks. A typical example of this approach is the AT&T Lucky net which has the goal of using SONET and ATM standards to provide up to 2.4 Gb/s throughput on a fiber media. Network architectures such as employed by LuckyNet build on the B-ISDN standards and technologies presently being developed for long distance telephony. Other approaches include: Hewlett-Packard's HANGMAN which operates at a baud rate of 1.3 Gb/s, having a maximum internode spacing of up to 10 km, and an individual user data rate of up to 800 Mb/s; and the Gigabit Nector Testbed at Carnegie-Mellon University which operates at the SONET OC-48 data rate of 2.488 Gb/s and uses a SONET/ATM interface.

These approaches are designed to be fully compatible with the future SONET/ATM standards which are expected to be adopted for the broadband switched public network, but they have the disadvantage that the electronic integrated circuits required for performing all the SONET and ATM processing at these high data rates are still in the state of development. This development will likely require GaAS IC technology and will be expensive. Additionally, all nodes or stations on such gigabit/sec networks must perform digital processing at the specified throughput data rate, thus limiting the flexibility of such configurations.

OBJECTS OF THE INVENTION

Accordingly, it is a primary object of this invention to obviate the above noted and other disadvantages of the prior art.

It is a further object of the invention to provide a broadband high throughput communication system utilizing inexpensive electronic components.

It is a further object of this invention to provide a communication network having multiple communication channels on a single optical fiber.

It is a further object of this invention to provide a communication network having multiple communication channels and a common control channel for the orderly acquisition of a communication channel.

It is a further object of this invention to provide a communication network having multiple communication channels wherein the communication channels are multiplexed utilizing a subcarrier multiplexing technique.

It is a further object of this invention to provide a communication network having multiple communication channels wherein the communication channels are multiplexed utilizing a subcarrier multiplexing technique, and operate at various data rates.

It is a further object of this invention to provide a communication network having multiple communication channels wherein the communication channels are multiplexed utilizing a subcarrier multiplexing technique, and operate using various data communication protocols.

It is a further object of this invention to provide a communication network having multiple communication channels wherein a token is updated to show acquisition of one of the communication channels.

It is a further object of this invention to provide a communication network having multiple communication channels wherein the communication channels are multiplexed utilizing a time division multiplexing technique.

It is a further object of this invention to provide a communication network having multiple communication channels wherein the communication channels are multiplexed utilizing a time division multiplexing technique with all channels operating at the same data rate.

It is a further object of this invention to provide a communication network having multiple communication channels with a primary node to regenerate attenuated signals on the multiple communication channels.

It is a further object of this invention to provide a communication network having multiple communication channels with regular nodes for the reception and transmission of data to other regular nodes on the network.

SUMMARY OF THE INVENTION

The above and other objects and advantages are achieved in one aspect of the present invention by utilizing subcarrier multiplexing (SCM) to achieve multigigabit/second total data rates over a single optical fiber. Advantageously, high aggregate throughput for the optical fiber is achieved using electronics designed for lower data rates. For example, a 1 Gb/s throughput can be achieved by operating 10 parallel FDDI SCM data streams on a single fiber using a single optical carrier, or a 1.8 Gb/s throughput can be achieved by operating 12 parallel STS-3 (155 Mb/s) SONET SCM data streams, again on a single fiber with a single optical carrier. Each node of the network continuously monitors a separate control channel, carried on the same optical signal, to determine the status of the subcarrier multiplexed data channels. Tokens indicating the status of each subcarrier multiplexed data channel are circulated on the control channel. A node, desiring to transmit data to another node on the network, waits for an open subcarrier multiplexed channel as indicated by the token, acquires the channel by setting a status indicator, writes the destination address of the data into the token, and initiates transmission on the acquired subcarrier multiplexed channel. A node, receiving a token with its address in the destination address field for a particular subcarrier multiplexed channel, tunes its subcarrier receiver to the identified channel to receive the data. The control channel can be either transmitted on a subcarrier or at baseband. Likewise, the data can be transmitted at baseband and the control channel transmitted on a subcarrier.

In another aspect of the invention, time division multiplexing (TDM) is utilized to achieve multiple information channels on a single optical fiber. Each node of the network continuously monitors a separate control channel which is time division multiplexed on the optical cable, and determines the status of the individual multiplexed data channels. A token indicating the status of each time division multiplexed data channel is circulated on a control channel. A node, desiring to transmit data to another node on the network, waits for an open time division multiplexed data channel as indicated by the token, acquires the channel by setting a status indicator in the token, and writes the destination address of the data into the token, and initiates transmission on the acquired time division multiplexed channel. A node, receiving a token with its address in the destination address field for a particular time division multiplexed channel, monitors the incoming optical signal to acquire the data carried in the time slot identified by the token.

BRIEF DESCRIPTION OF THE DRAWINGS

For a better understanding of the present invention, together with other objects, advantages and capabilities thereof, reference is made to the following Description and appended claims, together with the Drawings, in which:

FIG. 6 is an illustration of one control channel and seven data channels multiplexed according to one embodiment of the invention.

DETAILED DESCRIPTION OF THE INVENTION

Figure 1:
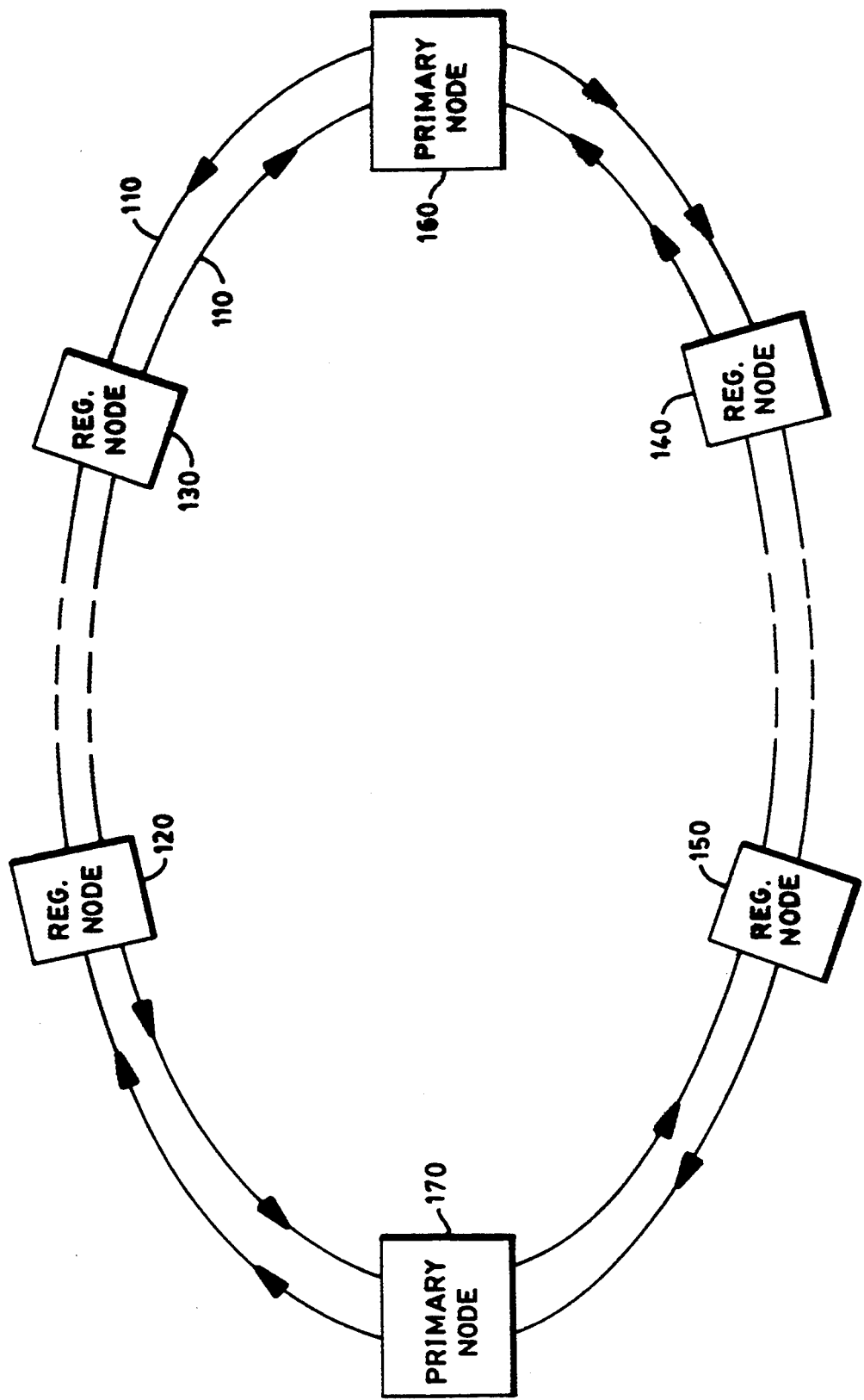
FIG. 1 is an illustration of a communication network in which the present invention is embodied.

Referring to FIG. 1, two singlemode optical fibers 110 connect four network regular nodes 120, 130, 140, and 150 and two primary nodes 160 and 170 in a ring architecture. One of ordinary skill in the art will recognize that although four nodes are shown in FIG. 1, a plurality of nodes could be connected to the cable in this configuration, and that the number four is used only for exemplary purposes. Each node, contains at least one optical receiver, for receiving multiplexed data on the optical fiber 110, and at least one optical transmitter for transmitting a multiplexed signal onto the optical fiber.

The bandwidth of the optical fiber 110 carries a plurality of multiplexed data channels for communicating among the nodes, and a control channel for controlling access to the individual data channels. Regular nodes receive and transmit multiplexed data, and determine network access by continuously monitoring the control channel for availability of an open data channel. Primary nodes compensate for noise accumulation and dispersion in the ring by regenerating the multiplexed digital information channels and the control channel. Multiple primary nodes may be configured as necessary to control transmission quality on the network.

Figure 2:
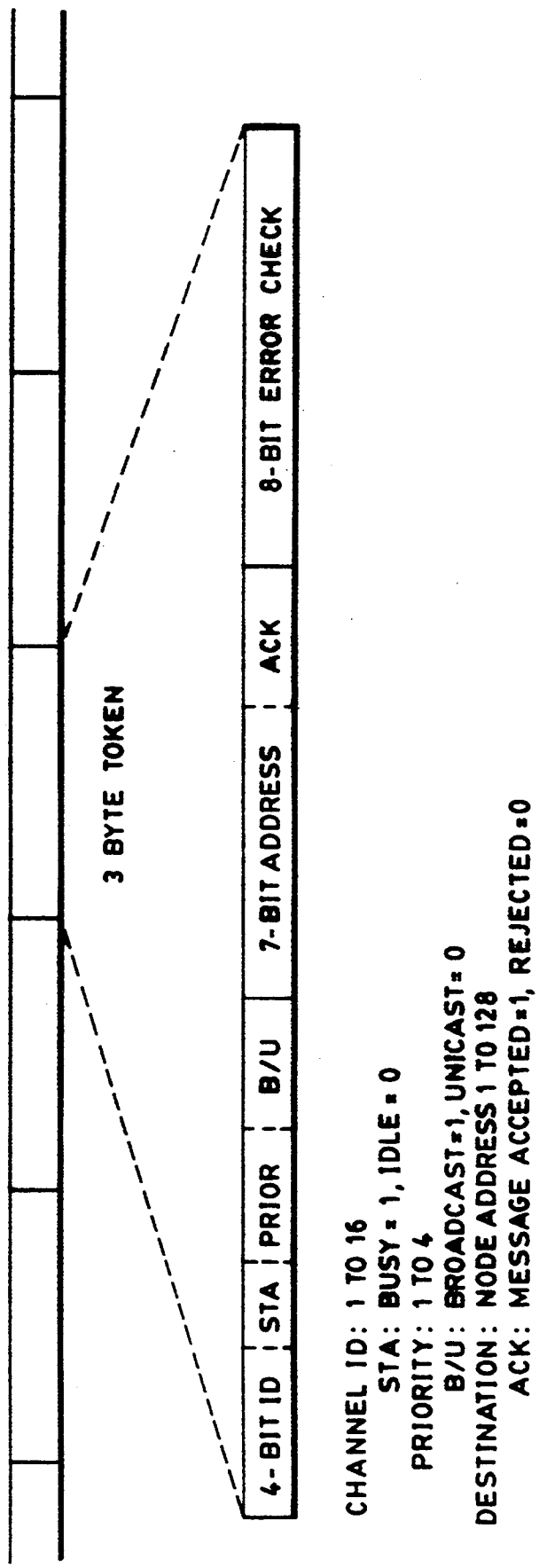
FIG. 2 depicts a data structure of a token in accordance with one embodiment of the current invention.

Access to the ring is as follows: A control channel continuously circulates a sequence of control tokens which indicate the status of the multiplexed data channels. Each node receives, processes, and retransmits the control channel. One example of a token consists of a data channel identifier (ID), a status bit (STA, 1=busy, 0=open), priority bits (PRIO), a destination node address (DNA), and an acknowledgment bit (ACK, 1=message accepted, 0=message rejected). Such an embodiment is shown in FIG. 2.

It will be recognized by one of ordinary skill in the art that the control token's data structure may have differing implementations without departing from the scope and spirit of the present invention.

In one embodiment of the current invention, multiple data channels are multiplexed with a control channel using a subcarrier multiplexing (SCM) technique.

The control protocol utilizing a subcarrier multiplexing technique operates as follows: A node desiring to transmit data onto the ring monitors the control tokens on the control channel until a status bit identifying an open SCM data channel is found (ID=i, STA=O). The node takes control of data channel i by setting STA=1, inserting the destination node address (DNA), and other required information into the "acquired" token. The token is then retransmitted on the ring. The node subsequently tunes its SCM transmitter to frequency i, and after a set delay of several bytes, the node transmits a datagram into channel i. When transmission of the datagram onto the ring is completed, the transmitting node issues a new token for channel i (ID=i, STA=O, DNA=O . . . ). The new token now makes channel i available for subsequent transmissions.

Each node continually monitors the control channel for a control token specifying its address within the destination address field. Finding such a control token, a node is alerted that another node is sending data on the channel ID specified by the control token. If the destination node is willing to accept the transmission, the node acknowledges such by updating the acknowledgment field (ACK) of the control token, and retransmits the control token on the ring. The node then tunes to the channel ID specified in the control token, and receives the incoming data message. When the acquired token completes a round-trip on the ring and returns to the source node, the source node checks the acknowledgement field (ACK) to determine if the message was accepted, and resets the token indicating that the control token is available for reuse. The source node strips the circulated message from the data channel, and clears the data channel for subsequent reuse.

As an option, the control protocol may incorporate a source node address (SNA) as a one-byte field in a four-byte token. A receiving node sends an acknowledgment by switching the source and destination node numbers and setting the ACK bit. This technique provides a means of acknowledgment, and facilitates the removal of the expired token from the ring by the sending node.

In this option, destination stripping of the data message rather than source stripping is an attractive alternative. After a receiving node strips the message from the SCM channel, clearing it for reuse, the receiver utilizes the channel itself to send data back to the original sender. This data can be either low-volume acknowledgments, or a data stream occupying the full channel capacity. While high volume bidirectional traffic is not common in computer data transfers, it is the norm in such applications as video conferencing. In such cases destination stripping makes efficient use of the available channel capacity.

The control protocol attempts to insure that a node does not attempt to transmit into an occupied channel. While the requirements of the control protocol avoid overwriting existing signals, destination conflict can occur at the receiver as in any multichannel system. For example, a network with 10 channels, 100 nodes and only one receiver per node could experience under full-load a 10% destination conflict rate at the receivers. If a 10% rate of destination conflict is unacceptable, a node can be provisioned with additional SCM receivers. In the above example, provisioning two receivers at each node reduces the conflict rate at full-load to 1%. The network operator has the flexibility of installing additional receivers at busy nodes to minimize the conflict.

The operation of a regular node in transmitting data messages on one of the subcarrier multiplexed channels is now described. A network nodes receiving a request to transmit data from an end-user processor via bridge (370), monitors the incoming control tokens to acquire an available subcarrier multiplexed channel. Finding such the control status byte for that channel is updated to reflect that the node is acquiring the data channel. The other fields of the control token data structure are completed to reflect the destination node's address, priority if applicable, error detection and correction information, and any optional information. After modifying the status indicator in the control token status field (STA), the acquisition of the channel by the node is indicated.

The updated control token of the acquired channel is retransmitted on the control channel of the ring before the node begins transmission of data on the acquired data channel. Subsequently, the message data is transmitted on the acquired channel. In one embodiment of the invention, the message data is removed from the ring by the originating node after circling the ring. In an alternate embodiment, the data message is removed by the receiving node and an acknowledgement or a return data message is transmitted to the sender by the receiver.

The operation of a regular node in receiving message data on one of the subcarrier multiplexed channels is now described. Each regular node continually monitors the control channel for a control token specifying its address within the destination address field. Finding such a control token, the destination node is alerted that another node is sending data on the channel ID specified by the control token. If the destination node is willing to accept the transmission, the node acknowledges such by updating the acknowledgment field (ACK) of the control token, and subsequently retransmits the control token on the ring. Alerted to an incoming transmission on channel i, the destination node tunes its subcarrier multiplexed receiver to frequency $f_i$ to receive the data message on that subcarrier.

It is understood by those of ordinary skill in the art that multiple control tokens, each representing an individual subcarrier multiplexed data channel, can be circulated.

The associated data channels may be all of similar type (N FDDI, N STS-3, etc.), or may have different transmission formats with different digital interfaces. A node desiring to transmit has the flexibility to select the appropriate digital interface and transmission formats from among those supported by the ring.

Figure 3:
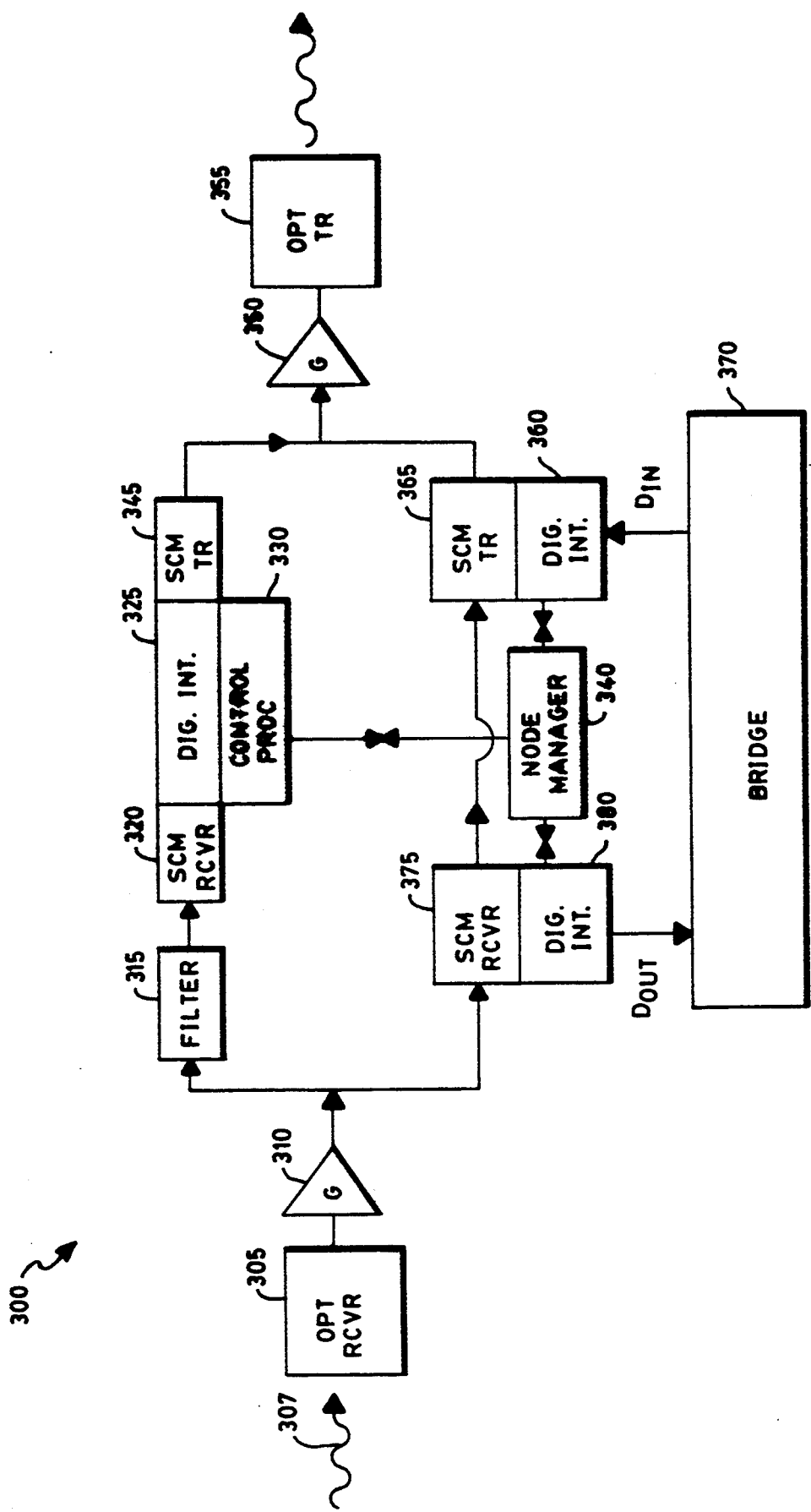
FIG. 3 is an illustration of one embodiment of a regular node as employed in the present invention.

In FIG. 3, a regular network node (300), supporting subcarrier multiplexed transmission, is depicted. The node employs a wideband Optical Receiver 305 for detecting an optical signal on the ring and converting the signal to an electrical signal. A low noise amplifier (LNA) 310 is coupled to Optical Receiver 305 for amplifying the resultant electrical signal. The signal is split by a conventional diplexor and one of the split signals is directed to a Filter 315 for isolating the control channel from the other data channels on the ring. A band pass filter is utilized if the control channel is on a subcarrier, and a low-pass filter is used when the control channel is at baseband. A Subcarrier multiplex receiver (SCM RCVR) 320 converts the control channel signal to a digital format suitable for electronic processing.

Network node 300 having received a request to transmit from bridge 370 monitors the control channel for an available channel to transmit. The digital signal derived from SCM RCVR 320 is processed by Digital Interface 325 and passed to control processor 330. Control Processor 330 monitors the control tokens to identify an open channel for transmission. It further updates the control token fields as described previously when a channel is acquired. Node Manager 340 advises Control Processor 330 of a node request to transmit data, and receives from the Control Processor 330 the channel ID of the acquired channel for transmission. Having completed the update of the requisite control channel information for acquiring a channel, the digital signal is passed to a SCM Transmitter 345, amplified by Power Amplifier 350 with automatic gain control, and transmitted onto the ring by Optical Transmitter 355. The node after acquiring an open channel, accepts nodal data from data line $D_{in}$ at Digital Interface 360 and passes the data to SCM transmitter 365. SCM transmitter 365 consists of at least one tunable microwave oscillator for transmitting an outgoing subcarrier multiplexed signal, and a combiner for combining the non-interacting subcarrier multiplexed signals passing through the node with the regenerated subcarrier multiplexed control signal, and with any outgoing subcarrier multiplexed signal generated at that node. The signal is amplified by power amplifier 350 with automatic gain control, and optically transmitted by laser transmitter 355.

The operation of a receiving network node is now discussed. Network node 300 continuously monitors the subcarrier multiplexed control channel to determine if another node is attempting to send to Network node 300. The node employs a wideband Optical Receiver 305 for detecting an optical signal on the ring and converting the signal to an electrical signal. A low noise amplifier (LNA) 310 is coupled to Optical Receiver 305 for amplifying the resultant electrical signal. The signal is split by a conventional diplexor and one of the split signals is directed to a Filter 315 for isolating the control channel from the other data channels on the ring. A band pass filter is utilized if the control channel is on a subcarrier, and a low-pass filter is used when the control channel is at baseband. A Subcarrier multiplex receiver (SCM RCVR) 320 converts the control channel signal to a digital format suitable for electronic processing. The digital signal derived from SCM RCVR 320 is processed by Digital Interface 325 and passed to Control Processor 330. Control Processor 330 examines the control channel tokens to determine if another node is attempting to send to network node 300. Upon receiving a control token with Node 300 identified in the destination address field (DNA) of the token, Control Processor 330 notifies the node manager 340. Node 300 tunes its SCM receiver 375 to the channel ID identified in the received control token to receive the data. The received data is converted to digital format by Digital Interface 380 and passed to bridge (370) on the data out line, $D_{out}$.

A node operates in any one of three modes:

(1) If a node is in the listen-mode, all N subcarrier multiplexed information channels are passed through the node using linear microwave amplifiers.

(2) If the node is in a receive mode, the appropriate subcarrier multiplexed channel is received from the subcarrier multiplexed signal block using a tunable oscillator and bandpass filter, and demodulated by conventional RF techniques.

(3) If the node wishes to transmit, it will generate the modulated subcarrier multiplexed carrier and insert it into the subcarrier multiplexed signal block using a power combiner.

The control channel and node manager electronics, providing control of a total data throughput of several gigibits/second can be implemented with TAXI-chips ™ from Advanced Micro Devices operating at 125 MHz and programmable logic devices operating at 12.5 MHz.

Since the subcarrier multiplexed ring is based on linear amplification of the non-interacting subcarrier multiplexed signals at each node, thermal noise from the microwave amplifiers will accumulate as a signal proceeds around the ring. After passing through K nodes, the noise will increase by 10 log(K) dB. Noise accumulation is dealt with in two ways. First the Carrier to Noise Ratio, CNR, and the ring topology for each subcarrier multiplexed channel must be specified based on the maximum number of regular nodes between primary nodes. If the CNR required for a specified Bit Error Rate, BER, is designated as $CNR_o$, then the signal generated at the transmitting node must be sufficient such that at the first receiving node $$CNR \geq CNR_o + 10 \log (K_{max})$$

where $K_{max}$ is the maximum number of regular nodes between primary nodes. In this way all adequate CNR is guaranteed at all regular nodes.

For typical digital subcarrier multiplexed signals (ASK, BPSK, FSK, QPSK) the minimum CNR for $10^{-9}$ BER is 13-18 dB. If $K_{max}=10$, then the optical link budgets must be specified such that a CNR≧23-28 dB is received at the first node after transmission. Since typical receiver sensitivities for subcarrier multiplexed signals carrying 10-20 channels is on the order of −13 to −20 dBm, this can be accommodated by increasing the received signal requirement to −8 to −15 dBm. This is perfectly adequate for node separations up to several kilometers. For longer distances, it may be necessary to use laser transmitters operating at +3 dBm or more, or to use an optical amplifier to further increase the link budget.

In addition to ensuring an adequate CNR on active channels, accumulated noise and erroneous messages must be removed from the ring. In the subcarrier multiplexed-ring this function is performed by a primary node. All N subcarrier multiplexed channels and the control channel are received, demodulated, regenerated, and retransmitted. In addition to regenerating the signals, the primary node can perform other network management functions. A primary node removes any spurious signals appearing on nominally open channels, corrects errors detected in the control channels, and removes circulating "orphan" messages, if the receiving node is disabled or otherwise unable to receive the message or remove defective tokens.

Figure 4:
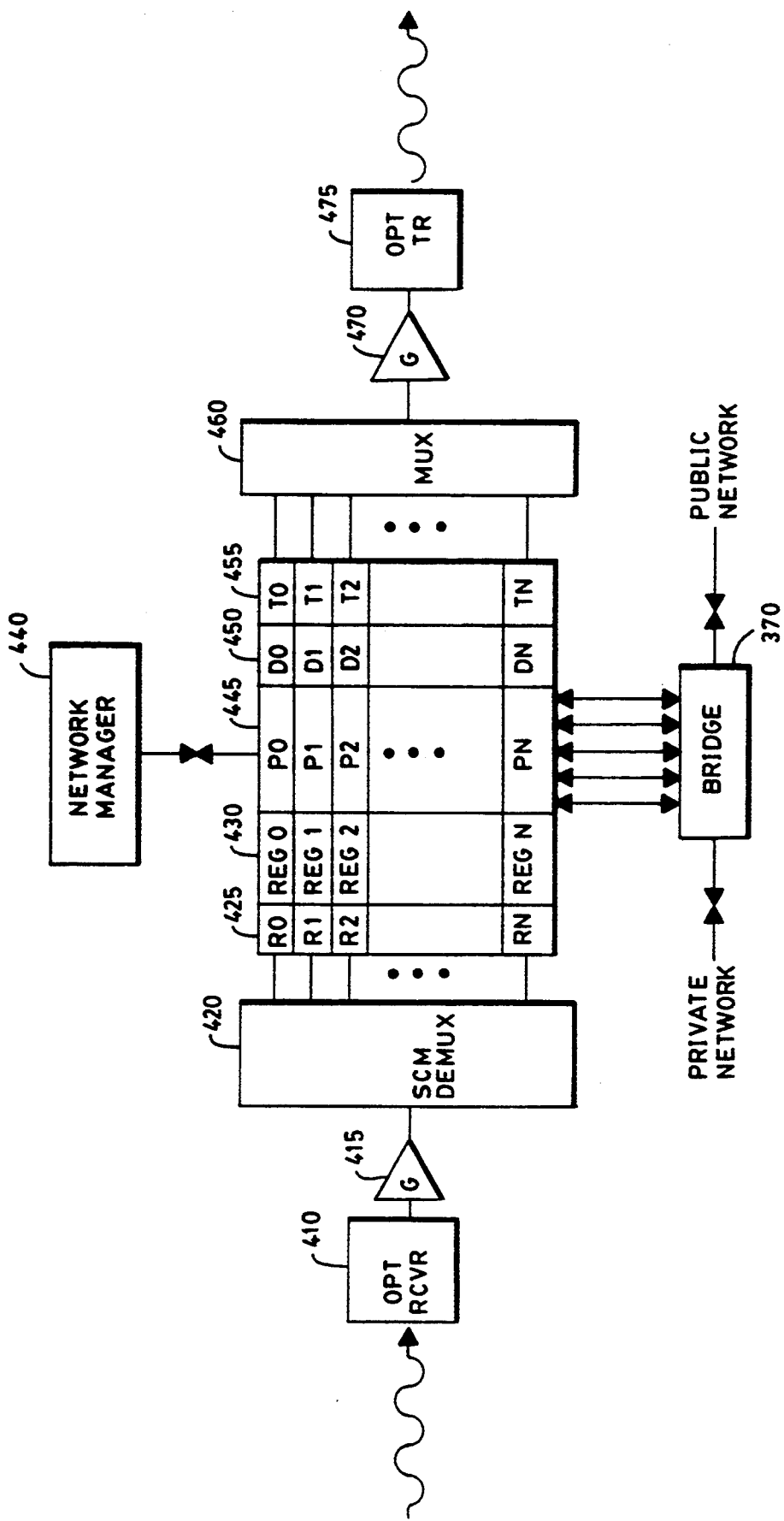
FIG. 4 is an illustration of one embodiment of a primary node as employed in the present invention.

A primary node 400 is depicted in FIG. 4. An optical signal 307 is detected by optical receiver 410, converted to an electrical signal and amplified by amplifier 415 before being passed to a subcarrier demultiplexer 420. The individual data channel signals are passed to a bank of receivers 425 (shown as R0 through RN) and individually regenerated at a bank of regenerators 430 (shown as Reg 0 through Reg N). Gateways to other networks can be interfaced to a primary node 400 by bridge 370. FIG. 4 shows both a private network and a public network gated to primary node 400 through a bank of registers 445 (shown as P0 through PN). The regenerated signals of bank 430 and the signals of bank 445 from gateways converted to bridge 370 are digitally coded at bank 450 and are individually transmitted by a bank of transmitters 455 (shown as T0 through TN) to multiplexor 460, amplified 470, and converted to optical signal and transmitted on the fiber by optical transmitter 475. The operation of a primary node is controlled by node manager 440.

The ring of the present invention is conveniently connected to other networks at the primary node for at this node all N subcarrier multiplexed channels are regenerated. Using the control protocol previously described, any incoming messages from other public or private networks can be easily inserted at this point, and any outgoing messages can be transferred to other networks at this point.

Figure 5:
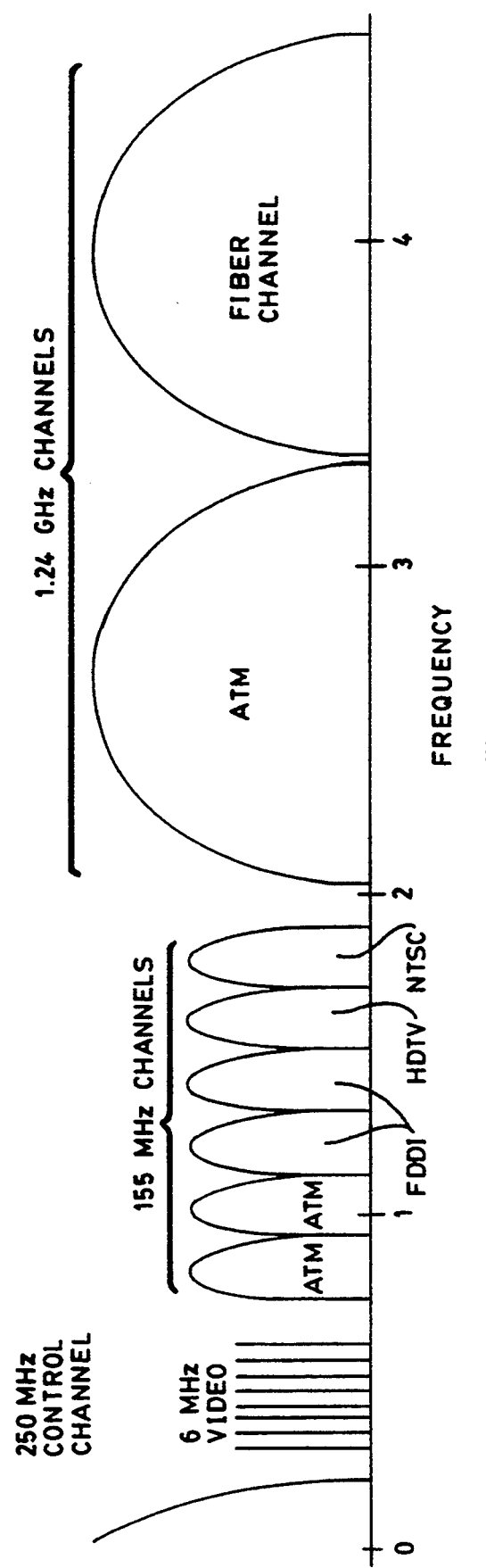
FIG. 5 is a frequency spectrum of the control and data channels multiplexed according to one embodiment of the invention.

FIG. 5 depicts one example of a frequency plan with a baseband control channel (250 Mbaud line rate) and 8 SCM information channels transmitted in the 600 MHz-5 GHz band. The SCM channels include two 1.24 Gb/s channels (ATM or FiberChannel) and six 155 Mb/s channels (ATM, FDDI, or high resolution video) providing a maximum throughput of 3.5 Gb/s. In the band between 250 MHz and 750 MHz a number of 6 MHz compressed digital video channels are indicated.

This embodiment of the invention describes a token-ring local area network which uses subcarrier multiplexing and existing digital interfaces to increase the total throughput data rates by an order of magnitude greater than those of the digital interfaces, All digital processing and control functions thus can be performed at the rates of the existing interfaces. The subcarrier multiplexed-ring can use FDDI or ATM interfaces operating at SONET rates to construct rings operating at 1-3 Gb/s. A subcarrier multiplexed-ring could use the emerging FiberChannel 1 Gb/s standard or higher SONET rates to build token rings operating in the 5-10 Gb/s range. By providing the option for several different digital interfaces (FDDI, ATM at STS-n, FiberChannel, DS-n) to operate in parallel, the subcarrier multiplexed-ring also creates an open architecture providing great flexibility. The subcarrier multiplexed approach allows each node to access the desired channel using a conventional subcarrier multiplexed electronic receiver. Information is processed at the channel data rate. Using commercially available microwave technology and subcarrier multiplexed techniques, ten to twenty parallel subcarrier multiplexed channels can be easily accommodated using a single optical carrier to produce ring data rates of 1 to 3 Gb/s.

In addition, since subcarrier multiplexed channels are independent and asynchronous, several different digital interfaces can be accommodated on the same ring, thus creating an open architecture providing flexibility.

In another embodiment of the present invention time division multiplexing is utilized to combine a control channel and multiple data channels. As depicted in FIG. 6, a segment of information composed of 8 bits which is circulated on the ring, consists of a control channel and a plurality of data channels. In FIG. 6 and the following, seven data channels are shown but one of ordinary skill in the art will clearly recognize that seven is used for exemplary purposes only, and that another number of data channels may be employed if appropriate time division multiplexing technology is available.

Figure 7:
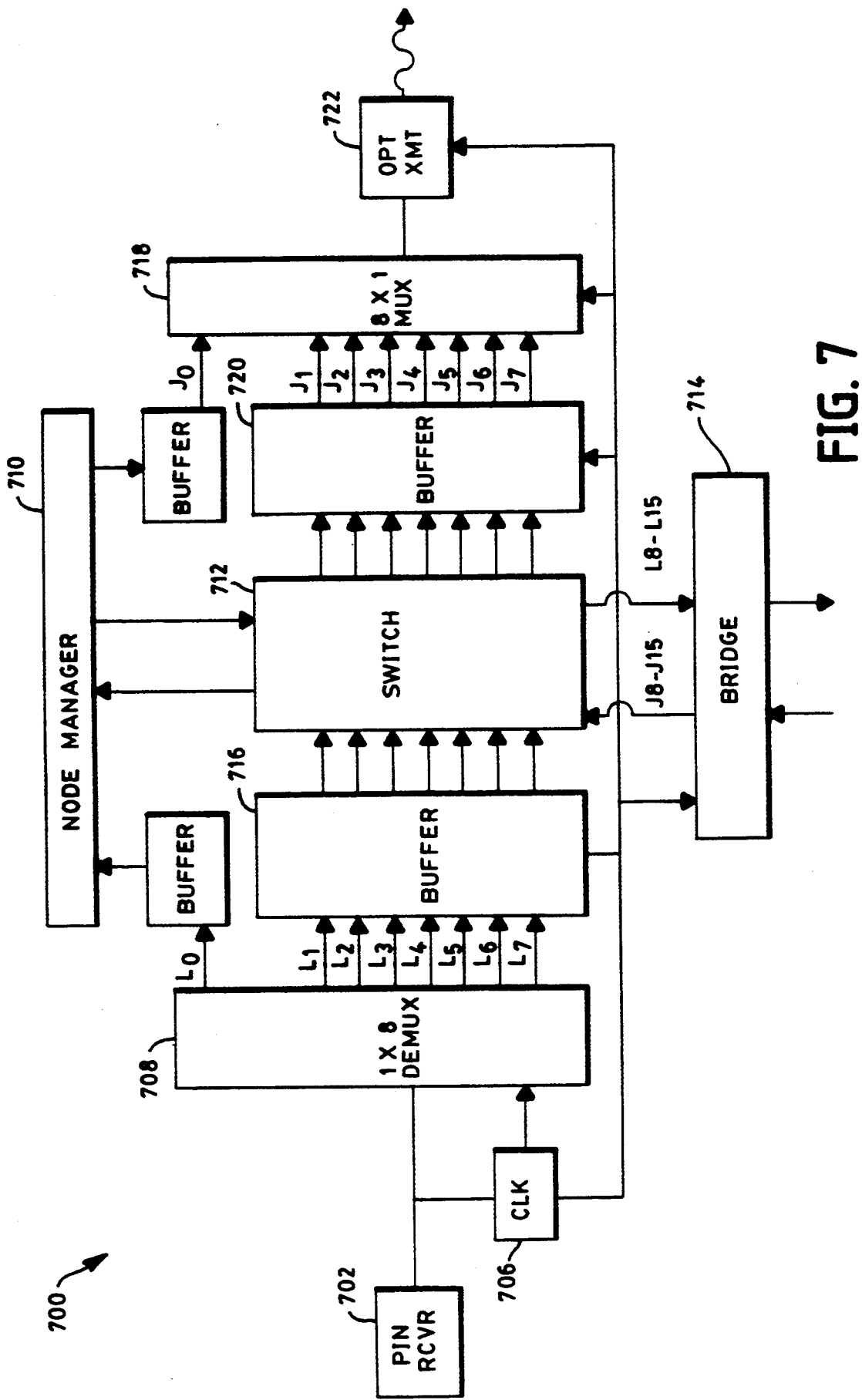
FIG. 7 is an illustration of one embodiment of a network node utilizing time division multiplexing.

Using 1×8 multiplexing technology for illustrative purposes, FIG. 7 shows apparatus for implementing a multichannel communication network with a control channel in accordance with this embodiment of the invention.

Node 700 has a PIN FET Receiver 702 for receiving and converting an optical signal on 307 optical fiber to an electrical signal. The electrical signal derived from PIN FET Receiver 702 is presented along with a clock signal determined by CLK Recovery circuitry 706 to a 1×8 demultiplexor 708 for demultiplexing the signal into the control channel and seven data channels. The eight output data lines from the demultiplexor 708 are designated L0 through L7. Output line L0 contains control channel information, and the other seven channels L1 through L7 represent data channels for communicating among nodes.

Output line L0, the control channel information, is presented to Node Manager 710. Node Manager 710 controls the operation of Switch 712. Switch 712 may operate in one of three configurations under the control of Node Manager 710. In the first configuration, Switch 712 operates in a pass through mode, allowing all input data on lines L1 through L7 to be passed through unchanged to the output lines J1 through J7, and subsequently retransmitted on fiber cable 704. In the second configuration, Switch 712 receives data on one or more of the data channel lines L1 through L7 and passes the data to Bridge 714 on data lines L8 through L15 as input data for processing. Lastly, Switch 712 can be configured to receive data from Bridge 714 for transmission onto the ring to another node in one of the data channel slots.

As was disclosed above, Node Manager 710 controls the operation of Switch 712, and chooses the switch configuration depending on the state of the control channel. The control channel consists of control token as shown in FIG. 2a and described previously. As previously described for the subcarrier multiplexed embodiment of this invention, each control channel token represents the state of an individual multiplexed data channel on the ring. The control channel token is circulated on the ring, and is the means by which a node assesses the data channels. A control channel token consists of a data channel identifier (ID), a status bit (STA, 1=busy, O-open), priority bits (PRIO), a destination node address (DNA), and an acknowledgement bit (ACK, 1=message accepted, 0=message rejected). The operation of Node 700 will now be described for each of the Switch 712 configurations.

In pass through mode, Node Manager 710 allows the data from data lines L1 through L7 of the demultiplexor 708 to flow into a FIFO buffer 716. FIFO buffer 716 may be a RAM (Random Access Memory) or another means of electronic storage. Node Manger 710, having determined from the control token that no other node is attempting to communicate with Node 700 transmits the data stored in FIFO Buffer 716 to the output data lines J1 through J7 for time division multiplexing at multiplexor 718 through an optional FIFO buffer 720. The time division multiplexed data is further presented to optical transmitter 720 for transmission on fiber cable 704.

Network Node 700 interfaces to bridge 714 for coupling a network node to a general purpose computer for processing data or specialized hardware for bridging the Network node to another communications network such as an X.25 packet switch network, or a 802.X subnet. Bridge 714 notifies the Node Manager 710 if it is making a request to send data to another node on the network. Bridge 714 is also notified by Node Manager 710 of incoming data to be processed by Bridge 714.

Bridge 714, having data to transfer on the ring to another node, notifies Node Manager 710 of its request to transmit. After acknowledging the request, Node Manager 710 queries each newly received control token to determine if there is an open data channel. Finding such, Node Manager 710 after buffering the incoming data on lines L1 through L7 in FIFO buffer 716 acquires the data channel by setting the status bit (STA) in the token and inserting the destination address of the data to be transmitted in (DNA) of the acquired token. The control token is passed as serial data to output data line J0, and multiplexed with the seven data channels J1 through J7 by multiplexor 718, and optically transmitted by transmitter 722.

Having acquired a data channel for transmission, Node Manager 710 notifies Bridge 714 that it is ready to receive data for transmission on the acquired channel. Bridge 714 passes the data to be transmitted on one of the data lines J8 through J15 to Switch 712. Switch 712 outputs the data received from Bridge 714 on one of the output lines J1 through J7, which corresponds to the acquired channel. Having completed transmission, Bridge 714 notifies Node Manager 710, and the Node Manager 710 presents a free token the 8×1 multiplexor to release the acquired channel.

As previously described, a node attempting to send data to node 700 acquires a specific data channel by setting the status bit (STA) in the control token and sets the destination address (DNA) to the destination address of Node 700. Node 700 continually monitors the control channel tokens for a token with its address as the destination address. Finding such, Node Manager 710 acknowledges the sender by setting the acknowledgement bit (ACK) in the control channel token and causes the token to be retransmitted on the ring. Node Manager 710 selects the data channel identified by the control token with its destination address specified and receives the data on that data channel. Node Manger 710 notifies Bridge 714 of the incoming data and passes the data to Bridge 714 over one of the lines L8 through L16 for processing by Bridge 714.

In another embodiment of the invention, a control channel comprised of circulating control tokens as previously described is subcarrier multiplexed, while the multiple data channels corresponding to the tokens of the control channel are multiplexed at baseband using time division multiplexing techniques.

Multiple control tokens as depicted in FIG. 2 are circulated on the ring. Each control token is associated with one of the multiple data channels, and identifies the availability of the data channel to be acquired for transmission. As previously stated, the data channels are time division multiplexed. Using 1×8 multiplexing technology, eight data channels can be supported as described in FIG. 6 since channel 0 need not be dedicated as the control channel.

If a node desires to transmit a data message on the ring to another node, the node desiring to transmit examines incoming control tokens on the subcarrier multiplexed control channel indicating an available time division multiplexed data channel. Finding such, the node acquires the data channel by setting the status to busy, and inserting the nodal address of the receiving node in the destination field. The control token is then recirculated on the ring. Having acquired a time division multiplexed data channel, the message data is transmitted on that channel.

A node receiving a control token on the subcarrier multiplexed control channel specifying its node address in the destination field is alerted that message data is forthcoming on the data channel corresponding to the channel ID of the received control token. The receiving node sets the acknowledgement field in the control token to notify the sender of the intent to receive the message data, and receives the message data on the designated time division multiplexed data channel. As was previously described, the message data may be stripped off the ring by the transmitting node or alternatively by the receiving node.

Figure 8:
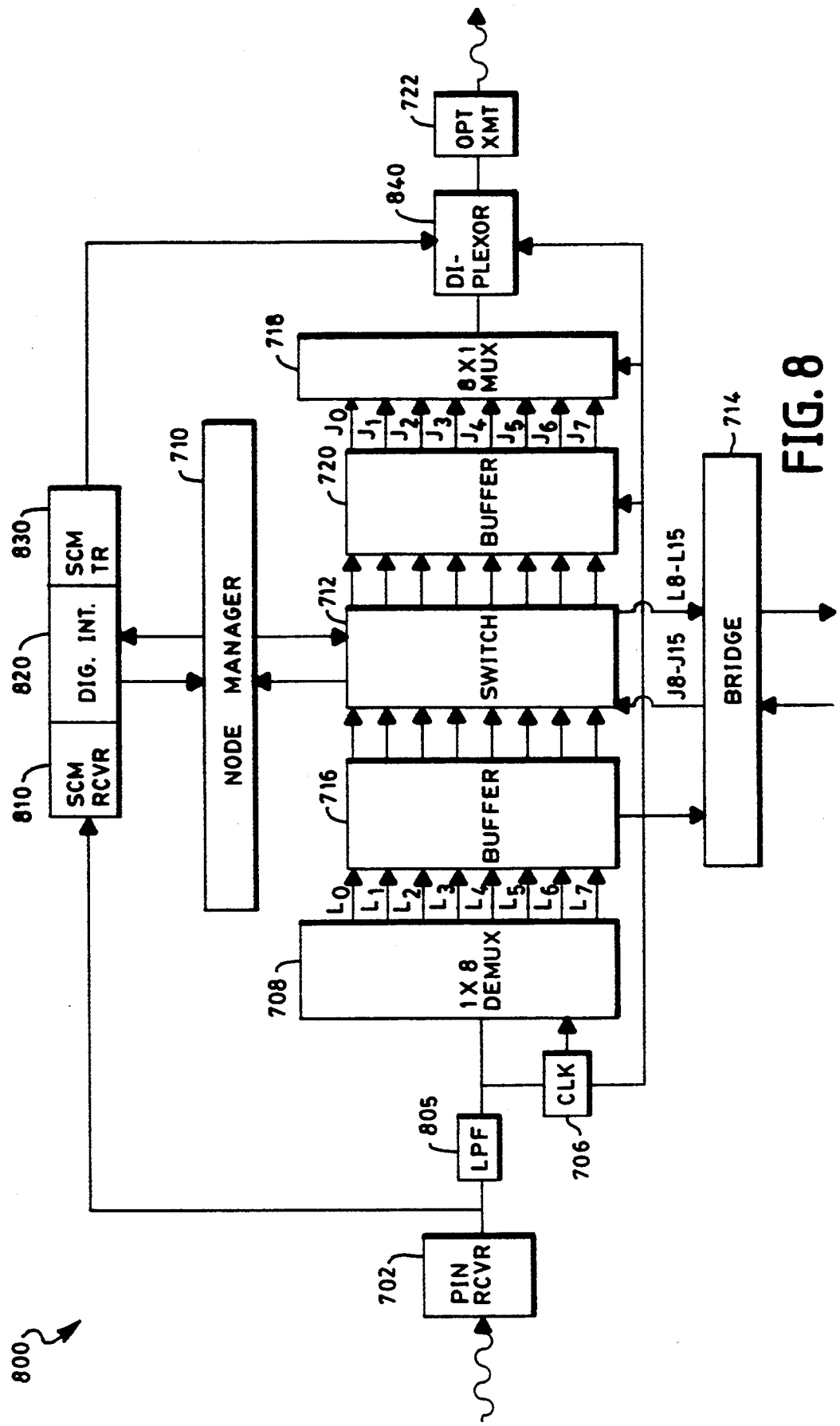
FIG. 8 is an illustration of one embodiment of a network node utilizing time division multiplexing to multiplex the data channels at baseband, and a subcarrier multiplexed control channel.

Referring to FIG. 8 wherein is shown one embodiment of a node utilizing time division multiplexing for the data channels and subcarrier multiplexing for the control channel. As described previously, a signal is received at PIN Receiver 702 and converted to an electrical signal. The signal is composed of a time division multiplexed data channel at baseband and a subcarrier multiplexed control channel. The output of PIN Receiver 702 is tapped and input to SCM Receiver 810 to recover the control channel signal. Digital Interface 820 converts the signal to a digital format and notifies the Node Manager 710 of received tokens, and receives from the Node Manager any changes to the control tokens in support of the node. In retransmitting the control channel, Digital Interface 820 interfaces to SCM Transmitter 830 to create the subcarrier multiplexed signal which is combined at Diplexor 840 with the data channel before transmitted on the ring by Optical Transmitter 722.

The output of the PIN Receiver 702 is low pass filtered at Filter 805 to isolate the baseband data channels. The output of Filter 805 is presented to the Multiplexor 708 wherein the node functions as described previously except that all the channels are used as data channels. Before being transmitted on the ring the data channels are combined at Diplexor 840 with the subcarrier multiplexed control channel.

While there has been shown and described what are at present considered the preferred embodiments of the invention, it will be obvious to those skilled in the art that various changes and modifications can be made therein without departing from the scope and spirit of the invention.

What is claimed is:

1. A communication system comprising:
   a node means for processing message data including a transmitter means for transmitting said message data among said node means, and a receiver means for receiving said message data from said node means;
   a communication means coupled to said node means for transporting said message data, said communication means including one or more subcarrier multiplexed data channels for transmitting and receiving said message data and a single dedicated control channel separate from said multiplexed data channels having one or more control channel tokens circulating thereon;
   wherein said transmitter means is responsive to the control channel tokens of the control channel in acquiring one of the data channels for transmission of said message data on said communication means, and said receiver means is responsive to the control channel tokens of said control channel for receiving said message data on one of said data channels.

2. The communication system of claim 1 wherein: said control channel is subcarrier multiplexed.

3. The communication system of claim 1 wherein: said control channel is at baseband.

4. The communication system of claim 1 wherein: said control channel token include a status field to determine if a data channel is acquired for transmission of said message data.

5. The communication system of claim 1 wherein: said control channel token include a destination address field for specifying the node to which said message data is transmitted.

6. The communication system of claim 1 wherein: said node means is a regular node.

7. The communication system of claim 1 wherein: said node means is a primary node.

8. The communication system of claim 1 wherein: said control channel token specifies the data channel on which message data is received by the receiver means.

9. The communication system of claim 1 wherein: said control channel token include an acknowledgement field for notifying the transmitter means by the receiver means.

10. A method of a first node transmitting data to a second node for a communication ring having multiple data channels and a subcarrier multiplexed control channel, separate from said multiple data channels, with a circulating control channel token, the method comprising at the first node in sequence the steps of:
   (a) determining that data is to be sent from the first node to the second node;
   (b) receiving a control channel token on the control channel;
   (c) examining said control channel token to determine a data channel that is available for transmission;
   (d) selecting a time division multiplexed data channel that is available for transmission;

(e) updating said control channel token to indicate that the selected data channel is not available for transmission by another node;

(f) placing the address of the second node in the destination address field of the control channel token of the selected data channel;

(g) transmitting the control channel token on the control channel;

(h) transmitting data on the selected data channel of the communication ring.

11. A method of a first node receiving data from a second node on communication ring having multiple data channels and having a control channel, separate from said multiple data channels, with a circulating control channel token, the method comprising at the first node in sequence the steps of:

(a) receiving a control channel token on the control channel;

(b) examining said control channel token for a data channel having the first node's address in the destination address field;

(c) updating the control channel token to acknowledge the second node;

(d) transmitting the control channel token on the communication ring;

(e) selecting said data channel of step (b);

(f) tuning the first node's receiver to the selected data channel;

(g) receiving the data of the second node on the selected data channel of the communication ring.

12. The method of claim 11 wherein the control channel is subcarrier multiplexed.

13. The method of claim 11 wherein the data channels are subcarrier multiplexed.

14. A communication system comprising:

a node means for processing message data including a transmitter means for transmitting said message data among said node means, and a receiver means for receiving said message data from said node means;

a communication means coupled to said node means for transporting the said message data, said communication means including one or more time division multiplexed data channels for transmitting and receiving said message data and a single dedicated control channel separate from said multiplexed data channels having one or more control channel tokens circulating thereon;

wherein said transmitter means is responsive to the control channel tokens of the control channel in acquiring one of the data channels for transmission of said message data on said communication means, and said receiver means is responsive to the control channel tokens of said control channel for receiving said message data data on one of said data channels.

15. The communication system of claim 14 wherein: said control channel is time division multiplexed with the data channels.

16. The communication system of claim 14 wherein: said control channel token includes a status field t determine if a data channel is acquired for transmission of said message data.

17. The communication system of claim 14 wherein: said control channel token include a destination address field for specifying the node to which said message data is transmitted.

18. The communication system of claim 14 wherein: said node means is a regular node, 19. The communication system of claim 14 wherein: said node means is a primary node.

20. The communication system of claim 14 wherein: said control channel token specify the data channel on which message data is received by the receiver means.

21. The communication system of claim 14 wherein: said control channel token include an acknowledgement field for notifying the transmitter means by the receiver means.

22. The method of claim 10 wherein the control channel is time division multiplexed.

23. The method of claim 13 wherein the control channel is time division multiplexed.

24. The method of claim 11 wherein the data channels are time division multiplexed.

25. A communication system comprising:

a node means for processing message data including a transmitter means for transmitting said message data among said node means, and a receiver means for receiving said message data from said node means;

a communication means coupled to said node means for transporting said message data, said communication means including one or more time division multiplexed data channels for transmitting and receiving said message data and a single dedicated control channel, separate from said multiplexed data channels, modulated on a subcarrier frequency having one or more control channel tokens circulating thereon, and said control channel tokens specify the data channel on which message data is received by the receiver means;

wherein said transmitter means is responsive to the control channel tokens of the control channel in acquiring one of the data channels for transmission of said message data on said communication means, and said receiver means is responsive to the control channel tokens of said control channel for receiving said message data on one of said data channels.

26. The communication system of claim 25 wherein: said control channel token include a status field to determine if a data channel is acquired for transmission of said message data.

27. The communication system of claim 25 wherein: said control channel token include a destination address field for specifying the node to which said message data is transmitted.

28. The communication system of claim 25 wherein: said node means is a regular node.

29. The communication system of claim 25 wherein: said node means is a primary node.

30. The communication system of claim 25 wherein: said control channel token include an acknowledgement field for notifying the transmitter means by the receiver means.

* * * * *